US011341314B2

(12) United States Patent
Gunderson

(10) Patent No.: US 11,341,314 B2
(45) Date of Patent: *May 24, 2022

(54) METHOD FOR MANAGING AND SELECTIVELY ARRANGING SETS OF MULTIPLE DOCUMENTS AND PAGES WITHIN DOCUMENTS

(71) Applicant: Bluebeam, Inc., Pasadena, CA (US)

(72) Inventor: Benjamin Gunderson, Simi Valley, CA (US)

(73) Assignee: BLUEBEAM, INC., Pasadena, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/907,661

(22) Filed: Jun. 22, 2020

(65) Prior Publication Data

US 2020/0320248 A1  Oct. 8, 2020

Related U.S. Application Data

(63) Continuation of application No. 16/050,933, filed on Jul. 31, 2018, now Pat. No. 10,733,357, which is a
(Continued)

(51) Int. Cl.
G06F 40/114 (2020.01)
(52) U.S. Cl.
CPC ................ G06F 40/114 (2020.01)
(58) Field of Classification Search
CPC ..................................... G06F 40/114
See application file for complete search history.

(56) References Cited

U.S. PATENT DOCUMENTS 6,308,179 B1  10/2001  Petersen et al.
6,366,933 B1   4/2002  Ball et al.
(Continued)

FOREIGN PATENT DOCUMENTS

EP      0426593 A2      5/1991
JP      4385770 B2  *  12/2009
JP      2009288974 A   12/2009

OTHER PUBLICATIONS

Copenheaver, Blaine R., PCT Notification of Transmittal of the International Search Report and the Written Opinion of the International Searching Authority, or the Declaration, dated Feb. 18, 2014.
(Continued)

Primary Examiner — Scott T Baderman
Assistant Examiner — Seung Woon Jung
(74) Attorney, Agent, or Firm — Bookof McAndrews. PLLC

(57) ABSTRACT

A method of computerized presentation of a plurality documents is disclosed. There is at least one original document with at least one original document page, and an addendum document with at least one addendum document page. A first selection of the at least one original document is received. There is a page sequencing array defined by an arrangement of each original document. A second selection of the addendum document is received. Each of the at least one addendum document page is correlated to an original document page. A document set is generated using the first selection and the second selection. For each addendum document in the document set, a priority identifier is determined. A document set view is generated from the document set with the original document pages and the addendum document pages, and is defined by an ordered page selection according to the page sequencing array.

20 Claims, 9 Drawing Sheets

Related U.S. Application Data continuation of application No. 13/756,162, filed on Jan. 31, 2013, now Pat. No. 10,067,917.

(56) References Cited

U.S. PATENT DOCUMENTS

| | | | |
|---|---|---|---|
| 7,949,938 B2 | 5/2011 | Champion et al. | |
| 7,979,388 B2 | 7/2011 | Khoury | |
| 8,566,711 B1 | 10/2013 | Srivastava | |
| 2002/0025081 A1 | 2/2002 | Kumazawa | |
| 2006/0075338 A1 | 4/2006 | Kusakabe et al. | |
| 2007/0133873 A1* | 6/2007 | Aoyagi | G06K 9/00463 382/176 |
| 2007/0300143 A1 | 12/2007 | Vanderport et al. | |
| 2008/0278756 A1* | 11/2008 | Huenemann | G06F 40/114 358/1.18 |
| 2009/0175495 A1 | 7/2009 | Kamei et al. | |
| 2009/0187598 A1 | 7/2009 | Vohariwatt et al. | |
| 2009/0193210 A1 | 7/2009 | Hewett et al. | |
| 2010/0185627 A1 | 7/2010 | Se | |
| 2011/0078552 A1 | 3/2011 | Lumley et al. | |
| 2012/0036150 A1 | 2/2012 | Richter et al. | |
| 2012/0050790 A1 | 3/2012 | Hong | |
| 2012/0084155 A1 | 4/2012 | Roy et al. | |
| 2012/0259835 A1 | 10/2012 | Vanderport et al. | |
| 2013/0174025 A1* | 7/2013 | Lee | G06F 40/197 715/251 |

OTHER PUBLICATIONS

European Search Report and Opinion for Application No. 13873569.1, dated Sep. 12, 2016, 8 pages.

\* cited by examiner

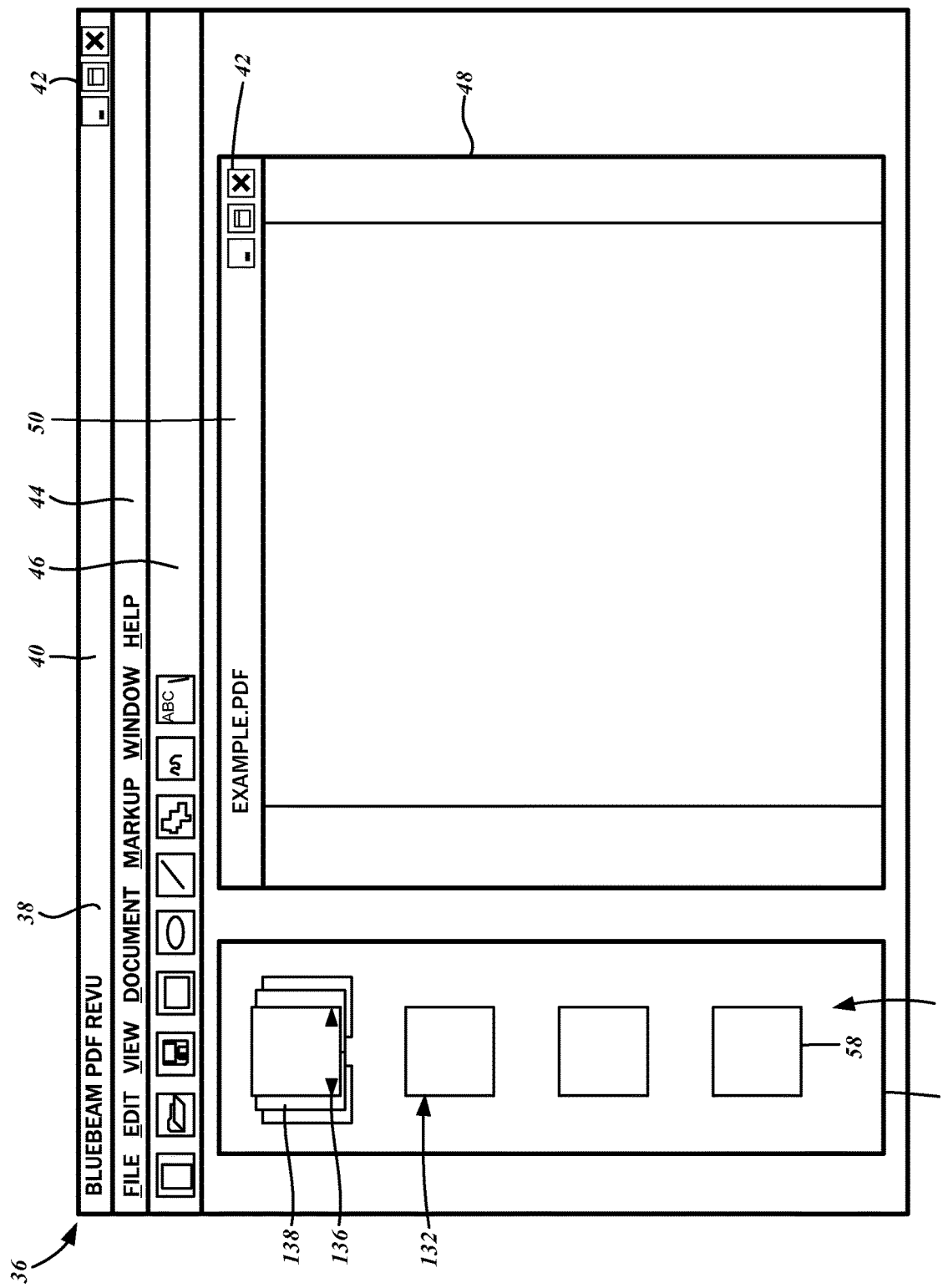

METHOD FOR MANAGING AND SELECTIVELY ARRANGING SETS OF MULTIPLE DOCUMENTS AND PAGES WITHIN DOCUMENTS

CROSS-REFERENCE TO RELATED APPLICATIONS

This application is a continuation of and claims the benefit of priority to U.S. application Ser. No. 16/050,933 filed Jul. 31, 2018, which is a continuation of and claims the benefit of priority to U.S. application Ser. No. 13/756,162 filed Jan. 31, 2013, now U.S. Pat. No. 10,067,917 issued Sep. 4, 2018, all of which are incorporated herein by reference in their entireties.

STATEMENT RE: FEDERALLY SPONSORED RESEARCH/DEVELOPMENT

Not Applicable

BACKGROUND

1. Technical Field

The present disclosure relates generally to document management, and more particularly to a method for managing and selectively arranging sets of multiple documents and pages within documents.

2. Related Art

The creation, distribution, and management of information are core functions of business. Information or content can be presented in a variety of different ways, including word processing documents, spreadsheets, graphics, photographs, engineering drawings, architectural plans, and so forth. In electronic form, these are generally referred to as documents, and may be generated and manipulated by computer software applications that are specific thereto. A typical workflow in the enterprise involves various personnel, oftentimes across disparate geographic locations, collaborating to create, review, and/or edit such documents.

Due to the existence of many different computing platforms having a wide variety of operating systems, application programs, and processing and graphic display capabilities, it has been recognized by those in the art that a device-independent, resolution-independent file format was necessary to facilitate such exchange. In response to this need, the Portable Document Format (PDF), amongst other competing formats, has been developed.

The PDF standard is a combination of a number of technologies, including a simplified PostScript interpreter subsystem, a font embedding subsystem, and a storage subsystem. As those in the art will recognize, PostScript is a page description language for generating the layout and the graphics of a document. Further, per the requirements of the PDF storage subsystem, all elements of the document, including text, vector graphics, and raster (bitmap) graphics, collectively referred to herein as graphic elements, are encapsulated into a single file. The graphic elements are not encoded to a specific operating system, software application, or hardware, but are designed to be rendered in the same manner regardless of the specificities relating to the system writing or reading such data. The cross-platform capability of PDF aided in its widespread adoption, and is now a de facto document exchange standard. Although originally proprietary, PDF has been released as an open standard published by the International Organization for Standardization (ISO) as ISO/IEC 3200-1:2008. Currently, PDF is utilized to encode a wide variety of document types, including those composed largely of text, and those composed largely of vector and raster graphics. Because of its versatility and universality, files in the PDF format are often preferred over more particularized file formats of specific applications.

Depending on workflow conventions that may be particular to a single business, or common amongst similar businesses or across an industry, document management can vary in complexity. The most basic practice is to store a single document in a single file on a hierarchical file system that is organized according to directories and subdirectories. This may be suitable for simple projects where there is a single document of minimal length, or where there are multiple documents, each are largely independent of the others and do not require concurrent review and/or revision. Some sharing may be possible to the extent the file system is connected to a network, such that different users are able to access the files from local or remote computers also connected to the network. In order to avoid applying conflicting changes, individual files are typically locked upon being opened, allowing access to only one user while all others are restricted.

Although there are collaboration systems known in the art that allow for the concurrent editing of documents by multiple users, these are typically separate applications layered over the file system. In avoiding these proprietary systems, one practice for managing a large document involving many collaborators is the segregation into multiple files (PDF or otherwise) according to groups of collaborators. For example, one section of the document may be particular to one business unit, while another section of the document may be particular to another business unit. So long as the two sections and corresponding responsible business units are independent of each other, concurrent revisions are possible. In business fields such as engineering and architecture, multiple drawings for different aspects of the component or structure may be produced as part of a single project, and each drawing may be stored in a separate file. Furthermore, addendums that supersede earlier versions of documents or drawings may be stored together with the older versions. In each of the aforementioned cases, combining the files into a single one is deficient for a number of different reasons, including increased complexity, page count, and file size, the aforementioned file locking issue, and so forth. Some of the individual documents may be secured and flagged with attributes that explicitly prohibit such aggregation.

Nevertheless, it is desirable in some cases to view the entire collection of files making up the single document or multiple documents in a project all at once as a cohesive whole. Existing solutions require that all of the pertinent files be opened concurrently in order for the document to be viewed and navigated as a whole, largely negating the advantages of maintaining separate files for each document page or document segment. Furthermore, tracking each of the addendums and presenting the most recent version along with the remainder of the document or documents is not possible unless the files are particularly named with proper revision numbers and the older files are designated as outdated. This process is prone to error because the modifications must be made manually, and in some cases, security attributes may be set that prohibit such modifications and references to and from new/old versions. The ordering of the document and of the individual pages therein is limited to that structure set forth in the document itself, and is therefore inflexible.

Accordingly, there is a need in the art for a method for managing and selectively arranging sets of multiple documents and pages within documents. There is also a need in the art for such arranged sets to be of PDF documents.

BRIEF SUMMARY

The present disclosure contemplates a method of computerized presentation of a plurality documents, and the sorting and displaying of multiple pages of multiple documents in a single view, in particular. These documents may include at least one original document and an addendum document, and the identification of addendums and previous revisions is automated. The at least one original document may have at least one original document page, and the addendum document may have at least one addendum document page. An ordered view of pages in a collection of documents may be possible, as well as a clear identification of updated document revisions. The method may begin with receiving on a computer a first selection of the at least one original document. Each original document page may include a corresponding unique page identifier. Additionally, a page sequencing array may be defined by an arrangement of each original document.

The method may continue with receiving on the computer a second selection of the addendum document. Each of the at least one addendum document page may be respectively correlated to an original document page of the at least one original document. Furthermore, each addendum document page may include a corresponding unique page identifier.

There may also be a step of generating a document set using the first selection of the at least one original document and the second selection of the addendum document. For each addendum document in the document set, there may also be a step of determining a priority identifier of each addendum document page.

The method may further include generating a document set view from the document set. The document set view may be defined by an ordered page selection according to the page sequencing array. Additionally, the document set view may be generated from the original document pages and the addendum document pages based upon the unique page identifiers and the priority identifiers.

Another embodiment envisions the foregoing method being implemented as a series of steps executable by a data processing apparatus and embodied in non-transitory program storage medium. The presently contemplated embodiments will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which:

FIG. 3 is an exemplary user interface of a document reviewing software application that implements various aspects of the contemplated method for the presentation of a plurality of documents;

Common reference numerals are used throughout the drawings and the detailed description to indicate the same elements.

DETAILED DESCRIPTION

The detailed description set forth below in connection with the appended drawings is intended as a description of the presently preferred embodiment of a method of computerized presentation of a plurality of documents including at least one original document and an addendum document. It is not intended to represent the only form in which the present method may be developed or utilized. The description sets forth the functions and the sequence of steps for developing and operating the invention in connection with the illustrated embodiment. It is to be understood, however, that the same or equivalent functions and sequences may be accomplished by different embodiments that are also intended to be encompassed within the spirit and scope of the invention. It is further understood that the use of relational terms such as first, second, and the like are used solely to distinguish one from another entity without necessarily requiring or implying any actual such relationship or order between such entities.

Figure 1:
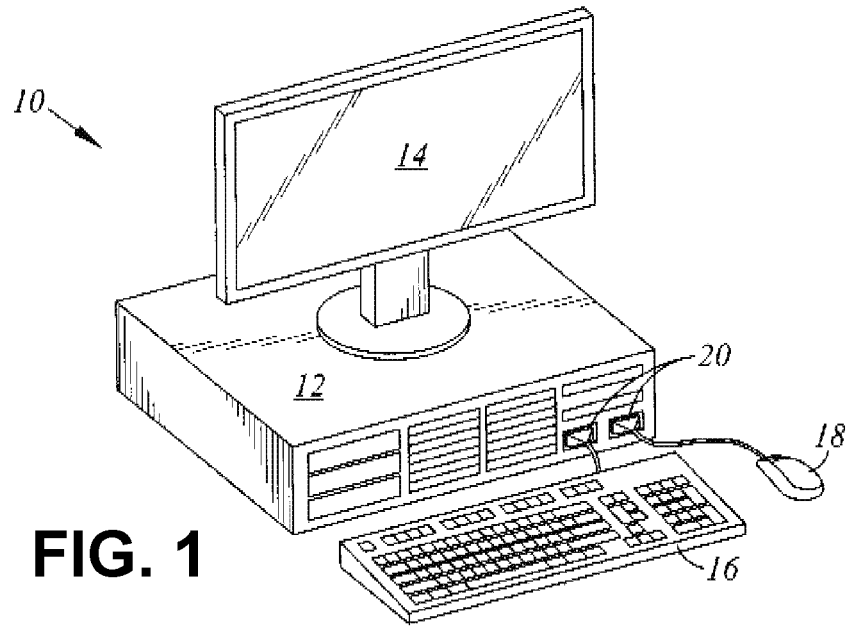
FIG. 1 is an exemplary computer system that may be capable to perform functions for use with aspects of the present invention including a display monitor.

FIG. 1 depicts an exemplary hardware environment in which various aspects of the contemplated method of document management and arrangement may be implemented. Generally, there is a computer system 10 with a system unit 12 and a display device 14. The display device 14 produced a graphical output from the data processing operations performed by the system unit 12. Input devices including a keyboard 16 and a mouse 18, for example, may be manipulated by a user to generate corresponding inputs to the data processing operations, and are connected to the system unit 12 via ports 20. Various other input and output devices may be connected to the system unit 12, and different interconnection modalities are known in the art.

Figure 2:
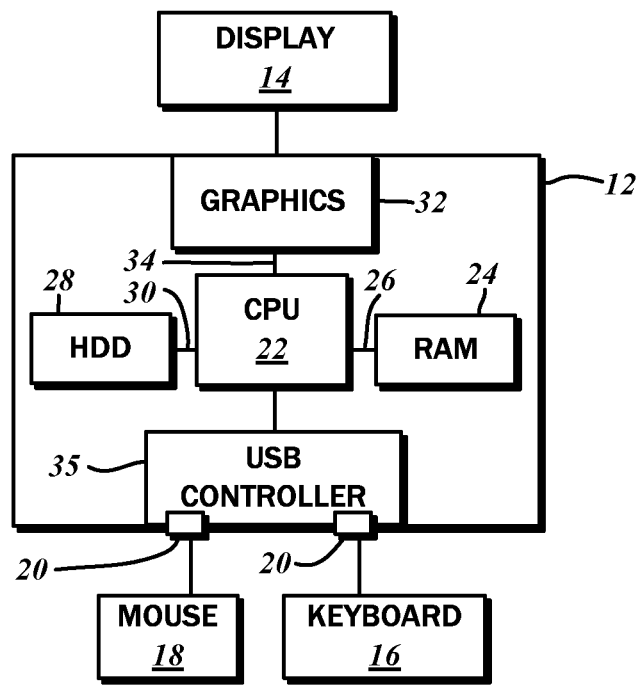
FIG. 2 is a block diagram of system components of the exemplary computer system of FIG. 1.

As shown in the block diagram of FIG. 2, the system unit 12 includes a processor (CPU) 22, which may be any conventional type. A system memory (RAM) 24 temporarily stores results of the data processing operations performed by the CPU 22, and is interconnected thereto typically via a dedicated memory channel 26. The system unit 12 may also include permanent storage devices such as a hard drive 28, which is also in communication with the CPU 22 over an input/output (I/O) bus 30. A dedicated graphics module 32 may also connected to the CPU 22 via a video bus 34, and transmits signals representative of display data to the display device 14. As indicated above, the keyboard 16 and the mouse 18 are connected to the system unit 12 over the port 20. In the embodiments where the port 20 is a USB type, there may be a USB controller 35 that translates data and instructions to and from the CPU 22 for the external peripherals connected via the port 20. Additional devices such as printers, microphones, speakers, and the like may be connected to the system unit 12 thereby.

The system unit 12 may utilize any operating system having a graphical user interface (GUI), such as WINDOWS from Microsoft Corporation of Redmond, Wash., MAC OS from Apple, Inc. of Cupertino, Calif., various versions of UNIX with the X-Windows windowing system, and so forth. The system unit 12 executes one or more computer programs, with the results thereof being displayed on the display device 14. Generally, the operating system and the computer programs are tangibly embodied in a computer-readable medium, e.g., the hard drive 28. Both the operating system and the computer programs may be loaded from the aforementioned data storage devices into the RAM 24 for execution by the CPU 22. The computer programs may comprise instructions, which, when read and executed by the CPU 22, cause the same to perform or execute the steps or features of the various embodiments set forth in the present disclosure.

According to one embodiment, a user can interact with the computer system 10, and specifically with the graphics being generated on the display device 14, via the mouse 18. The movement of a cursor generated on the display device 14 is tied to the movement of the mouse 18, with further interactivity being provided with input from the mouse buttons. Input from the keyboard 16 also provides interactivity with the computer system 10.

Although certain features of the present disclosure are described in relation to a computer system with such input and output capabilities, specifics thereof are presented by way of example only and not of limitation. Any alternative graphical user interfaces such as touch interfaces and pen/digitizer interfaces may be substituted. The analogs of those features will be readily appreciated, along with suitable modifications to accommodate these alternative interfaces while still achieving the same functionalities.

Along these lines, the foregoing computer system 10 represents only one exemplary apparatus of many otherwise suitable for implementing aspects of the present disclosure, and only the most basic of the components thereof have been described. It is to be understood that the computer system 10 may include additional components not described herein, and may have different configurations and architectures. Any such alternative is deemed to be within the scope of the present disclosure.

The present disclosure involves the sorting and displaying of multiple pages across multiple documents in a single view is contemplated. As utilized herein, the term document refers to standalone representation of data that can be opened, rendered and/or edited by such document reviewing software application. Accordingly, the document may be formatted and structured in a particular way so that its elements can be rendered consistently. In the exemplary embodiment discussed herein, the document reviewing software application handles PDF documents, and the following description will be in reference thereto. Documents in any other format that are editable or viewable with any other software application may be substituted.

Typically, a single document is stored in a single file on a hierarchical file system of the hard drive 28 or any other accessible storage device. In the context of the present disclosure, it is possible for a single document to be stored across multiple files. Thus, reference to a file is not necessarily interchangeable with a document. Although storage of documents on the file system would be the simplest since such feature exists by default in almost any computer operating system, it is also possible to implement various aspects of the present disclosure within a comprehensive document management system application that is layered above the operating system/file system.

FIG. 3 shows an exemplary graphical user interface 36 of a document editing software application in which various embodiments of the method of computerized searching may be implemented. The software application runs on a windowing system, and accordingly has a number of interface elements that are common to applications for the same. The functional, interactive features of the graphical user interface 36 are contained within a main window 38 that includes a title bar 40 with basic window controls 42 that variously minimize, maximize, and close the main window 38. In addition, the main window 38 includes a menu bar 44, from which various functions of the document reviewing software application may be invoked via activated pull-down menus. So that commonly utilized functions such as opening files, saving changes to the currently opened file, and so forth are readily accessible, there is also a tool bar 46. Within the main window 38 is a workspace window 48, which includes a sub-title bar 50 and the basic window controls 42. One or more of the aforementioned documents are rendered within the workspace window 48.

In order to aid in the navigation of documents and multiple pages thereof, there is a thumbnail sidebar 54 that includes an ordered arrangement 56 of thumbnails 58 that are reduced resolution representations of the content of each page. Thus, each thumbnail is understood to correspond to a single page. In the illustrated example, the part or page of what is shown in the workspace window 48 is limited, but the zoom level may be altered to show more or less of it. Each of the pages is understood to be accessible by scrolling through the workspace window 48, but with the thumbnail sidebar 54, it is possible to quickly access and jump to individual pages without such cumbersome scrolling. Conventionally, the thumbnail sidebar 54 shows a representation of a single document. However, in accordance with various embodiments of the present disclosure, it may be used to show a representation of more than one document, arranged according to certain predefined criteria. This arrangement, in turn, may be reflected in the view of such documents in the workspace window 48.

Figure 4A:
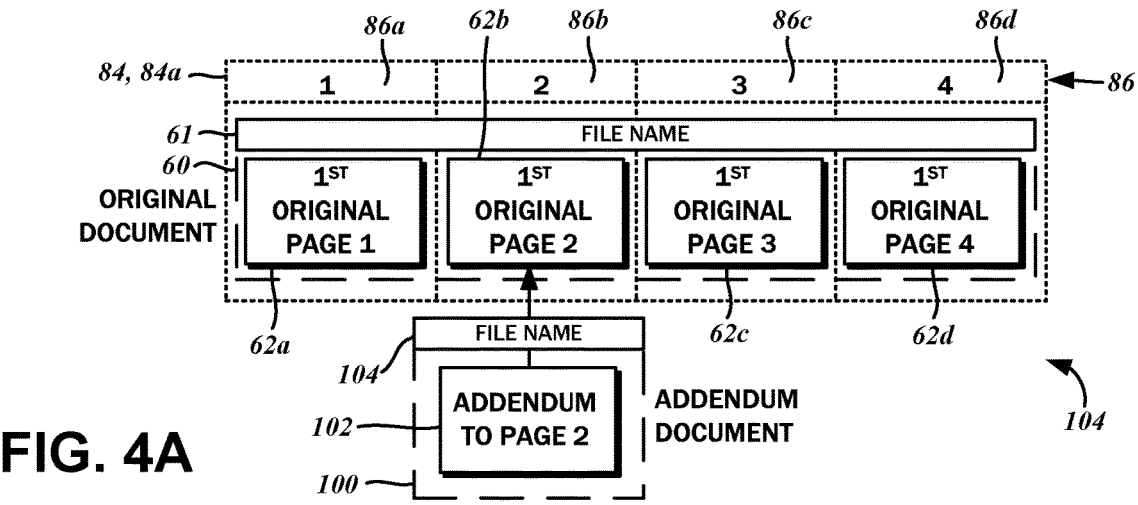
FIG. 4A illustrates one example document arrangement in which there is a single original document with multiple original document pages and a single addendum document with one addendum page.

Various embodiments of the present disclosure contemplate a method of computerized presentation of a plurality of documents including at least one original document and an addendum document. One example of the plurality of documents is illustrated in FIG. 4A, in which there is an original document 60 with a first original page 62*a*, a second original page 62*b*, a third original page 62*c*, and a fourth original page 62*d*. These pages may be designed with a corresponding unique identifier. Of course, these four original pages 62 are presented by way of example only, and there may fewer pages or more pages. This is the typical organization of simple multi-page documents such as brochures in which each of the pages are in a single file, and so there is a single file name 61.

Figure 4B:
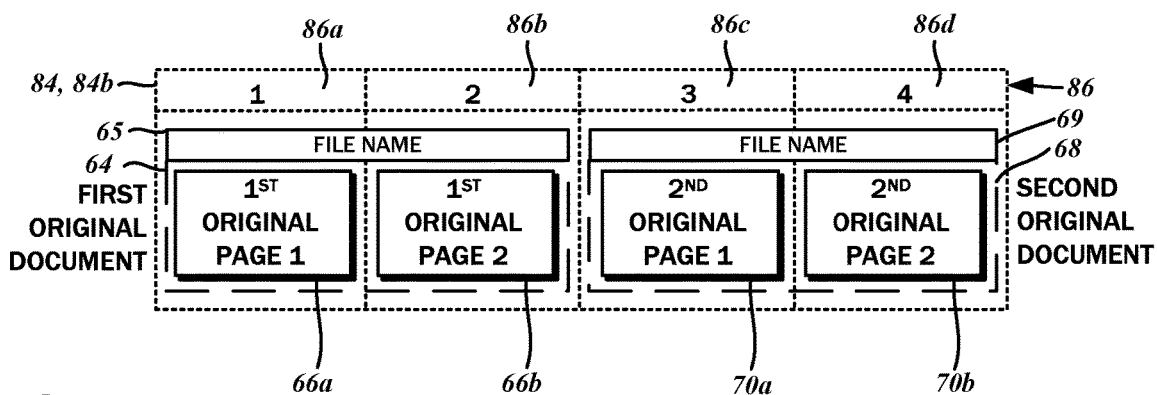
FIG. 4B illustrates another example document arrangement in which there are two original documents each with multiple original document pages.

Alternatively, as shown in FIG. 4B, there may be a first original document 64 with a first original page 66a and a second original page 66b, as well as a second original document 68 with its own first original page 70a and second original page 70b. The first original document 64 is identified by a first file name 65, and the second original document 68 is identified by a second file name 69. This arrangement may be utilized for more complex multi-page documents that can be conveniently segregated into multiple sections such as books, magazines, catalogs, and the like. In this case, the first original document 64 may be one section, while the second original document 66 may be another section.

Figure 4C:
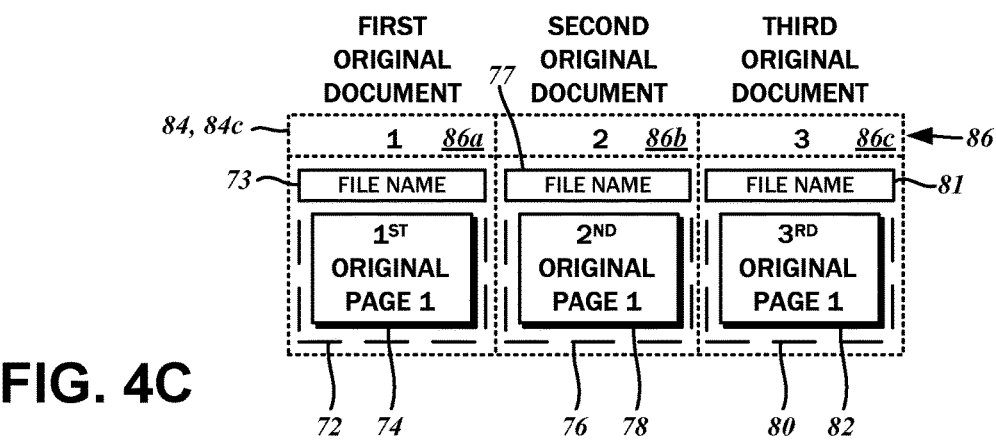
FIG. 4C illustrates yet another example document arrangement in which there are three original documents each with a single original document page.

According to still another alternative shown in FIG. 4C, each page may constitute a single document. In this example, there is a first original document 72 with an original page 74, a second original document 76 with an original page 78, and a third original document 80 with an original page 82. The first original document 72 is identified by a first file name 73, the second original document 76 is identified by a second file name 77, and the third original document 80 is identified by a third file name 81. This is the more common organization in architectural, engineering, and other technical settings. For example, one document may contain the base structure of a given area, while another document may contain the electrical wiring diagrams of the same area. Yet another document may contain the HVAC diagrams of the same area. With engineering projects, one document may contain drawings of an entire assembly, with other documents containing detailed views of components of the assembly.

According to the presently contemplated method, the entire set of documents in each of the aforementioned examples is uniquely viewable as a coherent whole, arranged in the proper page order. As such, broad-based accessibility to a complete project and its constituent documents is possible. In order to facilitate this arrangement, there is a page sequencing array 84 that is logically defined by an arrangement of the original documents. With the example shown in FIG. 4A, there is one original document 60, so the page ordering thereof defines the page sequencing array 84a. In relation to the example shown in FIG. 4B, there are two original documents 64, 68, and so the arrangement thereof defines a page sequencing array 84b. The example shown in FIG. 4C has three separate original documents 72, 76, and 80, and the ordered arrangement thereof defines a page sequencing array 84c.

In each illustrated example, the page sequencing array 84 is defined by page position index values 86. As shown in FIG. 4A, there is a first index value 86a corresponding to the position of the first original page 62a, a second index value 86b corresponding to the position of the second original page 62b, a third index value 86c corresponding to the position of the third original page 62c, and a fourth index value 86d corresponding to the position of the fourth original page 62d. Similarly, as shown in FIG. 4B, the first index value 86a corresponds to the position of the first original page 66a of the first original document 64, and the second index value 86b corresponds to the position of the second original page 68b also of the first original document 64. The third index value 86c corresponds to the position of the first original page 70a of the second original document 68, and the fourth index value 86d corresponds to the position of the second original page 70b of the second original document 68. Referring now to FIG. 4C the first index value 86a corresponds to the position of the first original page 74 of the first original document 72, the second index value 86b corresponds to the position of the first original page 78 of the second original document 76, and the third index value 86c corresponds to the position of the first original page 82 of the third original document 80. Although a specific data structure of the page sequencing array 84 has been shown, it is exemplary only, and the presently disclosed method may be implemented with any other suitable data structure.

As shown in FIG. 4A, the plurality of documents also includes an addendum document 100 with an addendum page 102. The addendum document 100, like the original documents 60 described above, is identified with a filename 104, and each addendum page 102 is identified with a corresponding unique page identifier. Even though only a single addendum page 102 is illustrated, it will be recognized that the addendum document 100 may contain any number of additional addendum pages 102. The particular way in which such additional addendum pages 102 are handled in accordance with various embodiments of the present disclosure will be described more fully below.

Figure 5:
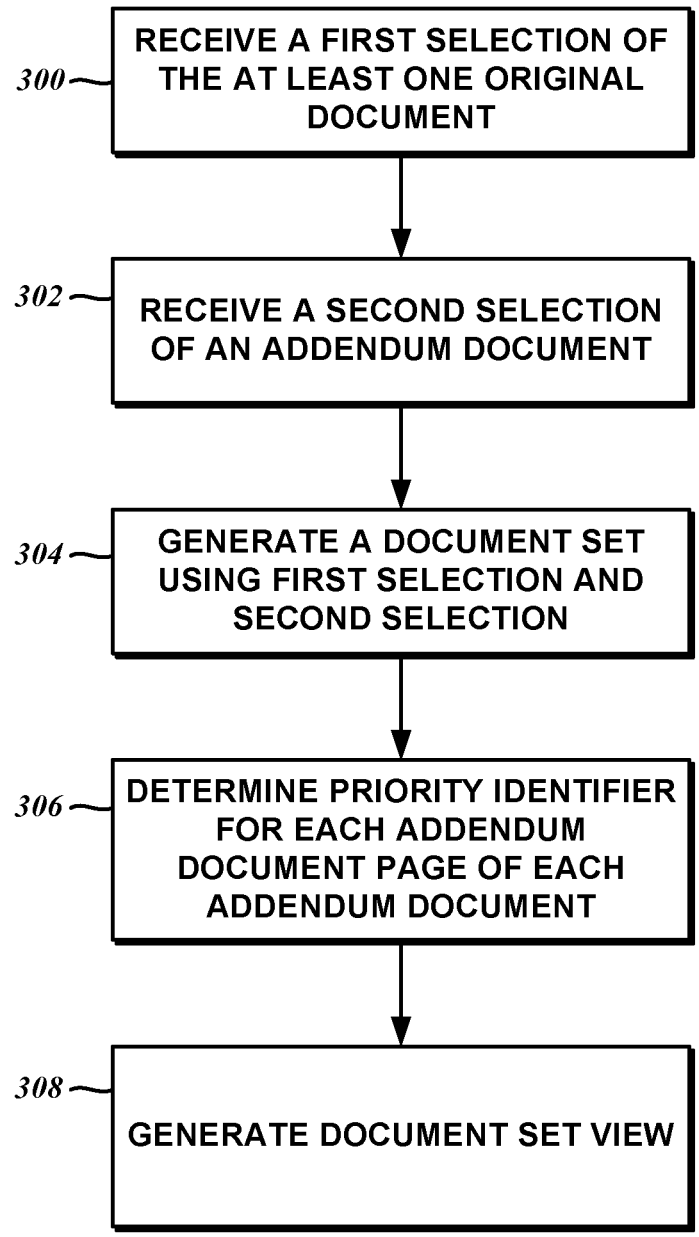
FIG. 5 is a flowchart depicting various steps of a method of computerized presentation of a plurality of documents.
Figure 6:
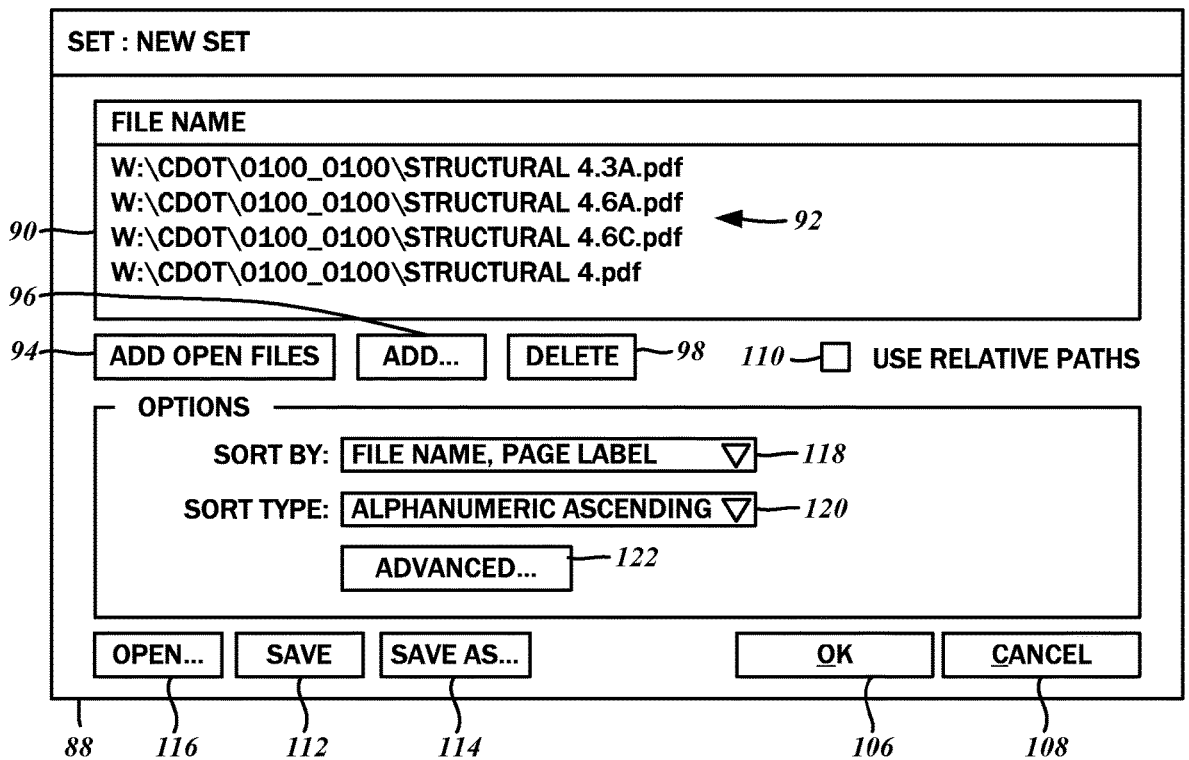
FIG. 6 is a document set definition dialog window through which a first selection of original documents and a second selection of addendum documents may be made.

With reference to the flowchart of FIG. 5, and in the context of the example shown in FIG. 4A, the method of presenting the plurality of documents includes a step 300 of receiving a first selection of the at least one original document 60. FIG. 6 illustrates an exemplary document set definition dialog window 88 through which such first selection may be made. More particularly, there is a file listing 90 of each of the files 92 that are designated to be a part of a subsequently defined document set. The file names shown in the listing 90 are by way of example only, and do not correspond to any particular original document mentioned herein. Referring again to the graphical user interface 36 shown in FIG. 3, within the main window 38, there may be multiple workspace windows 48 that show multiple documents. Each such opened document may be added to the set via the add open files button 94. Other files may be selected through the conventional file system access dialog box that is invoked with an add button 96. Furthermore, undesirable files 92 can be selected/highlighted within the file listing 90 and removed from the set by activating a delete button 98.

Generally, the addendum page 102 is understood to be updated or revised versions of a corresponding original page 62. Although an addendum is understood to have particular meaning in certain industries and the document processing workflows thereof, it is intended to refer to any subsequently modified or revised document that supplements, replaces, or otherwise takes priority over any older original document pages. When the plurality of documents is being presented, it is contemplated that the visibility of any addendum pages 102 is likewise prioritized. In the illustrated example, the addendum page 102 is designated as a replacement for the second original page 62b. In some cases, an addendum may also be a new page that is added to the original document 60, and when the documents are presented, it may be appended to the end.

Referring back to the flowchart of FIG. 5, and again in the context of the example shown in FIG. 4A, the method for presenting the plurality of documents also includes a step 302 of receiving a second selection of the addendum document 100. With reference to FIG. 6, the file listing 90 is understood to show the file of the addendum document 100. Accordingly, the second selection may be received on the computer system 10 via the document set definition dialog window 88. The same add open files button 94, add button 96, and the delete button 98 may be activated to invoke the same functionality discussed above in relation to the original document 60, that is, adding open addendum documents, adding further addendum documents, and deleting listed addendum documents.

Following the selection of the plurality of documents including the original document 60 in step 300 and the addendum document 100 in step 302, the method continues with a step 304 of generating a document set 104 using such first and second selections. The document set 104 is a logical collection of the aforementioned plurality of documents including the original document 60 and the addendum document 100. The step 304 may be executed as a result of activating an OK button 106. In order to cancel the generating of the document set 104, a cancel button 108 can be activated. The following description of the various operations that can be performed in relation to a document set will reference the specific document set 104 shown in FIG. 4A and FIG. 8 for the sake of simplicity. Those having ordinary skill in the art will recognize that the same operations can be performed in relation to more complex document sets, and examples thereof will be set forth more fully below.

Figure 8:
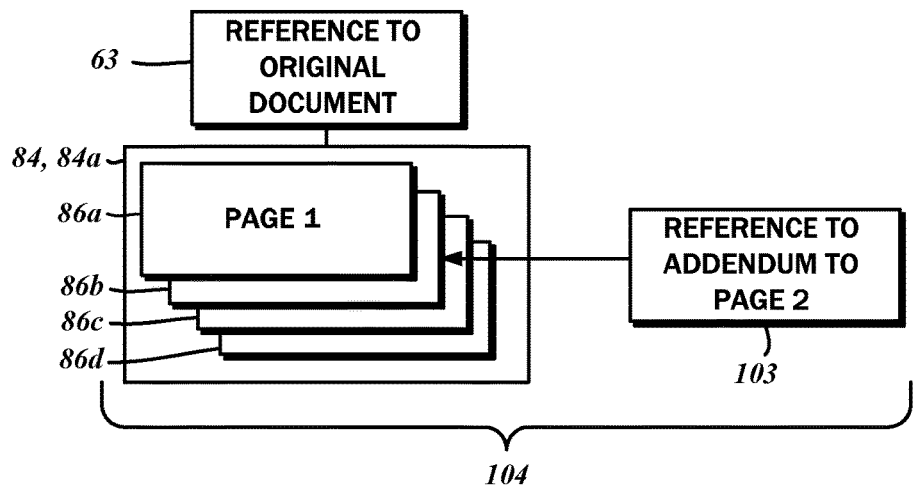
FIG. 8 illustrates an exemplary data structure of a document set based upon the arrangement of the documents shown in FIG. 4A.

As shown in the simplified representation of FIG. 8, the document set 104 may be defined by a reference 63 to the original document 60 and a reference 103 to the addendum page 102. The document set 104 is further defined by the page sequencing array 84, which sets forth the order and arrangement of each page in the document set 104. A position for each of the original pages 62 is reserved in accordance with the index 86 and its values 86a-86d, though it is not necessary for the content of the original pages 62 to be stored. Thus, the structure of the document set 104 can be stored in a separate file independent of the original document 60 and the addendum document 100. It will be recognized by those having ordinary skill in the art, however, that the data structure of the document set 104 may be implemented in a variety of different ways while retaining the same features relative to the functions that utilize it. Internal to the document set 104, there may be a link 110 establishing the original/addendum relationship between the addendum page 102 and the second original page 62b, though this is optional because the prioritization of the addendum page 102 can take place at the time of presentation.

The document set 104 may be defined in terms of file paths, i.e., the reference 63 and the reference 103 store the file path text that can be processed by the application to retrieve the referenced files. The file path can be absolute in which include file directory identifiers down to the root level, i.e., the "w:" drive are specified as shown in the example of FIG. 6. Once generated, the document set 104 can be stored on the local file system or any other accessible file system. This function may be invoked via a save button 112. If the document set 104 has already been saved, but a different file name therefor is desired, it is possible to so specify by first activating a save-as button 114, which is understood to invoke the conventional dialog box for file name entry. If an alternative document set 104 is desired, it make be retrieved by activating an open button 116, which invokes yet another conventional dialog box for file selection.

Along these lines, the generated document set 104 may be transferred to other file systems or locations on different computer systems 10 for processing and presenting the referenced original document 60 and the addendum document 100 thereon. Absolute file paths may be adequate when sharing of the document set 104 and its referenced files do not extend beyond a local network and are stored in a commonly accessible networked file system. However, this is not always the case, and it may be useful to package the document set 104 along with its referenced documents for transfer to a different system where the networked file system is not accessible. In this instance, relative file paths may be specified, and this option is selectable through a check box 110.

As indicated above, the order and arrangement of pages within the document set 104 is in accordance with the page sequencing array 84 and the association of each individual page to the corresponding index values 86a-d thereof. With an original document 60 that is stored in a single file, the order of the original pages 62a-62d therein is determined by that which is defined by the document itself. Implementations of the PDF standard may include page labeling features beyond standard numerical page indices, and so it may be possible to reset the page sequencing array 84 to a sorted order determined by the page label. It is understood that resetting the page sequencing array 84 to a sorted order determined by the page index is also possible.

Where there are multiple files as is the case with the example shown in FIG. 4B, the order and arrangement, as an initial matter, of the first original document 64 and the second original document 68, may be based upon the respective file names 65, 69 thereof. As within the document, e.g., between the pages in the first original document 64, the internally defined order is understood to control, whether it be the page labels or the page indices. The sorting order may be set via the document set definition dialog window 88, and particularly with a sort-by pull-down menu 118. Three possible sorting modalities are contemplated, including by file name followed by page index, by file name followed by page label, and also just by page label. Those having ordinary skill in the art will be able to readily ascertain the suitability of each of these options for particular document workflows. Further, different sorting functions besides those based on file name, page label, and page index are also possible.

After setting the sorting modality, the type and direction may be set via a sort type and direction pull-down menu 120. There are two types, including alphanumeric and numeric, as well as two directions, ascending and descending. These are presented in the sort type and direction pull-down menu 120 four selectable options: alphanumeric ascending, alphanumeric descending, numeric ascending, and numeric descending. The sorting type and the sorting direction is applied to any selected field, including the aforementioned page label and file name. Alphanumeric sorting is understood to involve the processing of each character in the sorted field from left to right. For example, if one field has the content "100" while another has the content "20," and ascending order has been specified, the "100" would be positioned before "20" because the first character, "1," precedes "2." On the other hand, ascending numeric sorting processes the number "20" as preceding "100." It will be appreciated that the foregoing sorting modalities are presented by way of example only and not of limitation, and any other suitable alternative may be substituted without departing from the scope of the present disclosure.

The first selection of the original document 60 and the second selection of the addendum document 100 may be received concurrently upon the plurality of documents being specified via the document set definition dialog window 88. As such, at the moment of receiving the first and second selections, the original document 60 and the addendum document 100 may be indeterminate. That is, while the generated document set 104 references each of the original document 60 and the addendum document 100, which specific reference points to an addendum and which specific reference points to an original document is unknown. To make this determination, an addendum filter is contemplated. In accordance with some embodiments, the addendum filter processes the file name of each of the referenced plurality of documents and/or the page labels of each page thereof, though any other searchable field may also be utilized.

Referring again to the flowchart of FIG. 5, the method may continue with determining a priority identifier of each addendum page 102 in each of the addendum documents 100. Again, although only one addendum document 100 with one addendum page 102 is illustrated in the basic example of FIG. 4A, it is expressly contemplated that there may be more than one addendum document, with some or all having more than one addendum page. This step of determining the priority identifier is understood to refer generally to the identification of pages as addendums, and amongst more than one addendum for the same page, which one takes priority.

Figure 7:
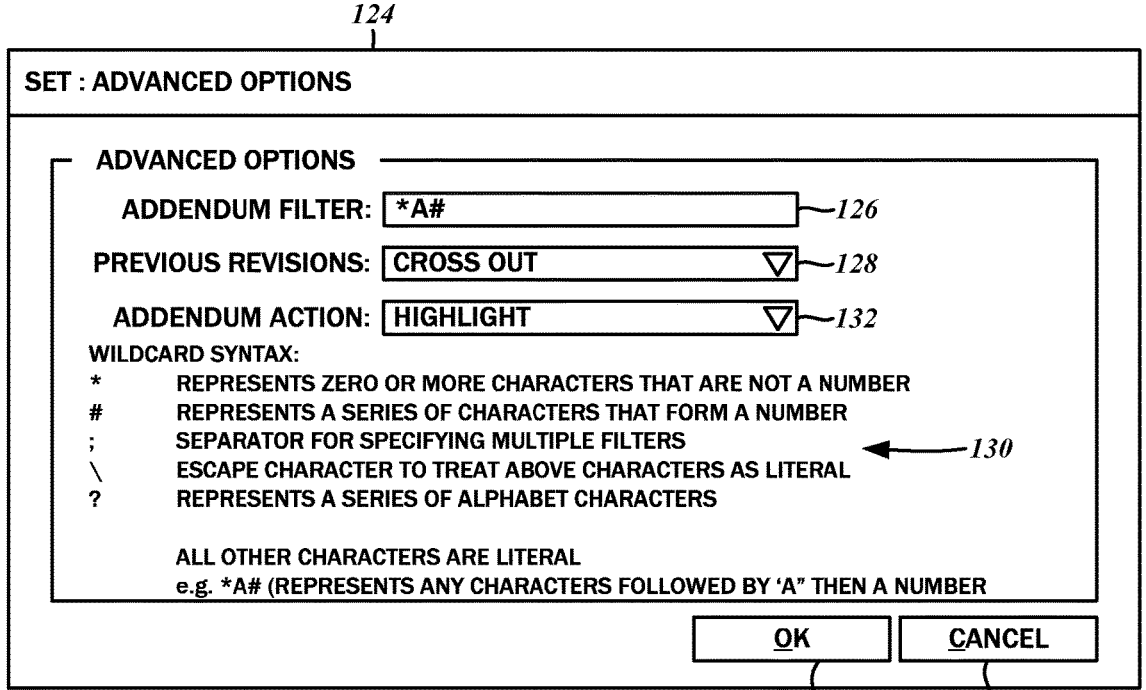
FIG. 7 is an option dialog window through which an addendum filter may be specified.

With reference to FIG. 6 and FIG. 7, activating a filter option button 122 on the document set definition dialog window 88 invokes a filter option dialog window 124. A filter string or predicate can be entered in a text entry box 126. The filter string is wildcard based, in which a star character "*" indicates any set of characters, a number sign or pound character "#" indicates a contiguous sequence of numeric characters only, and a question mark sign "?" represents a contiguous sequence of alphabet characters. Specifying other characters besides indicates a literal matching thereto. To the extent a filter based on the wildcard characters of "*" and "#" are needed for literal matching, an escape character, e.g., a backslash "\" can be specified. Furthermore, if additional filter strings are needed, each one can be separated with a semicolon character ";". In the example shown in FIG. 7, "*A#," a filter field first starting with any sequence of characters, followed by the character "A", and followed by a number is identified as an addendum. An explanation 130 of the use of the filter strings is provided within the filter option dialog window 124. By way of example, the file name "Structure3_A1.pdf" would be identified as an addendum, while "Structure3_C.pdf" would not. Those having ordinary skill in the art will recognize that the file naming and page labeling conventions are to be standardized. Additionally, the filter string is to be configured to identify those documents that have been so marked as addendums utilizing these standardized labeling conventions. The filter string is saved upon activating an OK button 106, and any changes there may be reverted by activating a cancel button 108. Though specific examples of wildcard characters that correspond to specific sequences of inputs have been introduced, there are numerous others that could also be utilized.

Returning now to the flowchart of FIG. 5, the method continues with a step 308 of generating a document set view from the document set 104. Again, as indicated above, the page sequencing array 84 defines the order in which the original documents 60, the original pages 62 thereof, the addendum documents 100, and the addendum pages 102 thereof is presented. This arrangement or sequence may also be referred to as an ordered page selection, which defines the document set view. Additionally, the document set view is also generated from the contents of the plurality of documents, and is understood to be based upon the unique page identifiers thereof that tie it to the index values 86a-d of the page sequencing array 84, as well as upon the corresponding priority identifiers.

The document set view can be displayed on the thumbnail sidebar 54 where it may be the most useful to navigate different versions of addendums and different original documents. The way in which the respective pages are visualized may be customized according to preferences set through the filter option dialog window 124 shown in FIG. 7. In particular, the treatment of previous revisions may be selected from several different options through a previous revisions display options pull-down menu 128. Presently there are two contemplated options including cross-out, which generates a pair of diagonally intersecting lines overlaid on the document page in a manner that indicates its deprecated status, as well as gray-out, which modifies the brightness of the document page also in a manner that indicates its deprecated status. In this regard, both of these actions may be referred to as deprecation indicators, and it is within the purview of those having ordinary skill in the art to develop alternatives that serve as such. An alternative option in which no deprecation indicators are added is also selectable via the revisions display options pull-down menu 128.

The visual treatment of the prioritized addendum page 102 may also be varied. The filter option dialog window 124 also includes an addendum option pull-down menu 132. One of the selectable options is the highlighting of a border 132 of the thumbnail 58 in the thumbnail sidebar 54 or other representation of the addendum page 102. Another option is to "stack" the original page 62 and any intervening addendum page 102 below the prioritized page. Those document pages not prioritized may be hidden from view, though it is possible to incorporate a pair of scroll buttons 136 to allow the navigation amongst previous versions 138. In such case, any set option in the revisions display options pull-down menu is disabled. Again, another possible option is for there to be no further visual treatment of the prioritized addendum page 102. The display of the thumbnails 58 may be supplemented with additional filename information, page numbers, and labels.

FIGS. 9A-9F show different uses cases and how various arrangements of original documents 60 and addendum documents 100 would be processed in accordance with the presently contemplated methods. To illustrate these sequences, certain features such as file names, page sequencing arrays, and the like already discussed above have been omitted, and only the minimum level of detail needed for a discussion of these use cases have been included.

Figure 9A:
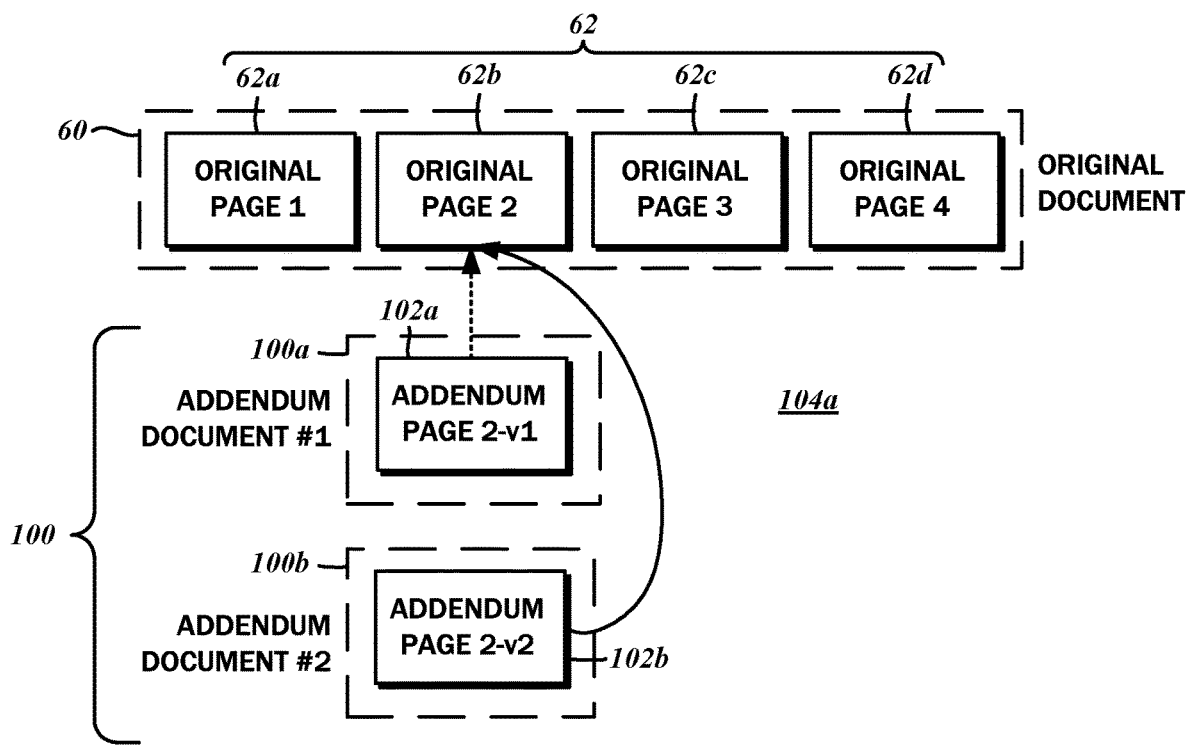
FIGS. 9A-9F illustrate example use cases of variously arranged original documents and addendum documents in accordance with the embodiments of the present disclosure.

FIG. 9A in particular depicts a scenario where there is one original document 60 with four original pages 62a, 62b, 62c, and 62d. Additionally, the document set 104a has two addendum documents 100, including a first addendum document 100a and a second addendum document 100b. The first addendum document 100a has an addendum page 102a, and the second addendum document 100b similarly has an addendum page 102b. Both the addendum page 102a and the addendum page 102b are to supplement the second original page 62b, but since the second addendum document 100b is a more updated version, it takes priority over the first addendum document 100b and its addendum page 102a. In the view of the document set 104a, the sequence order is thus the first original page 62a, the addendum page 102b, the third original page 62c, and the fourth original page 62d, though depending on the options set via the filter option dialog window 124, the original page 62b and the addendum page 102a remain accessible upon navigation thereto.

Figure 9B:
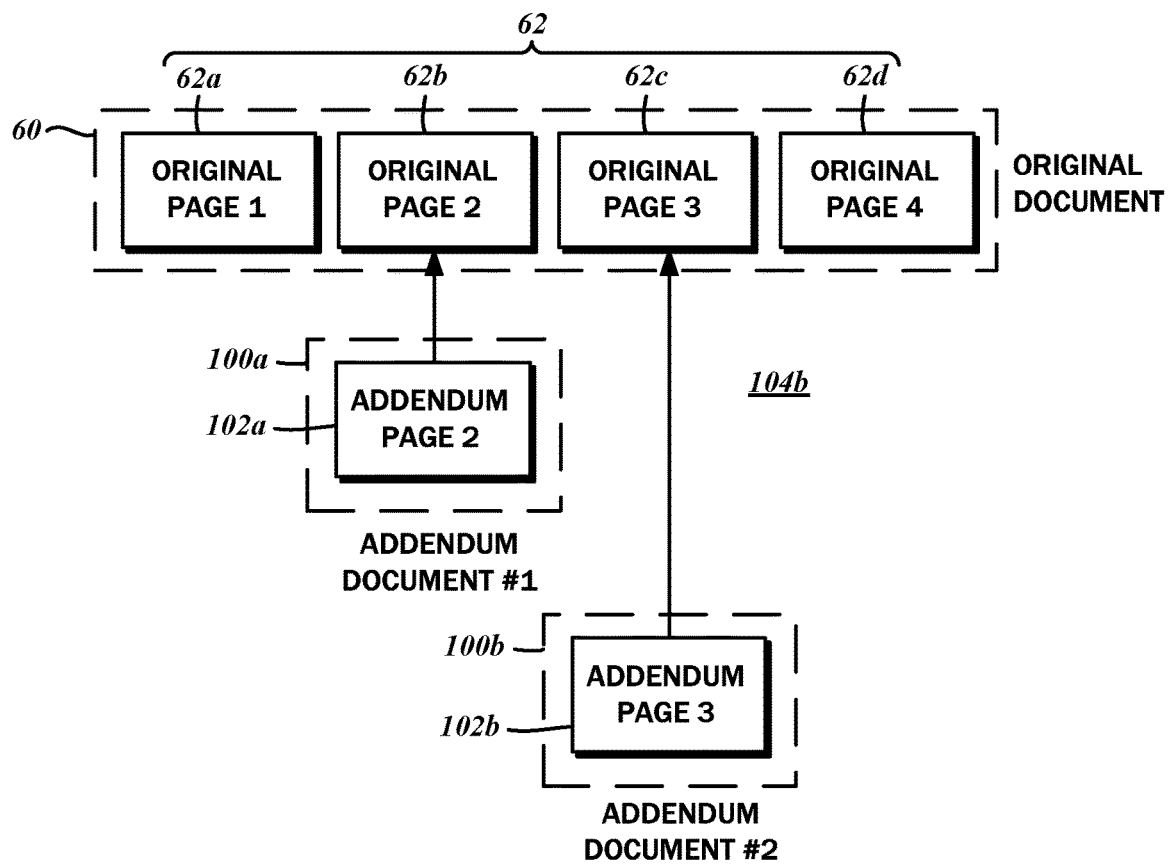

FIG. 9B illustrates a similar usage case as that described in relation to FIG. 9A above, where there is one original document 60 with original pages 62a-62d, and at least the first addendum document 100a with an addendum page 102a. As previously indicated, the addendum page 102a supplements the second original page 62b. Additionally, there is a second addendum document 100b also with a single addendum page 102b, which supplements a third original page 62c. In the set view of the document set 104b, the sequence order is thus the first original page 62a, the addendum page 102a, the addendum page 102b, and the fourth original page 62d.

Figure 9C:
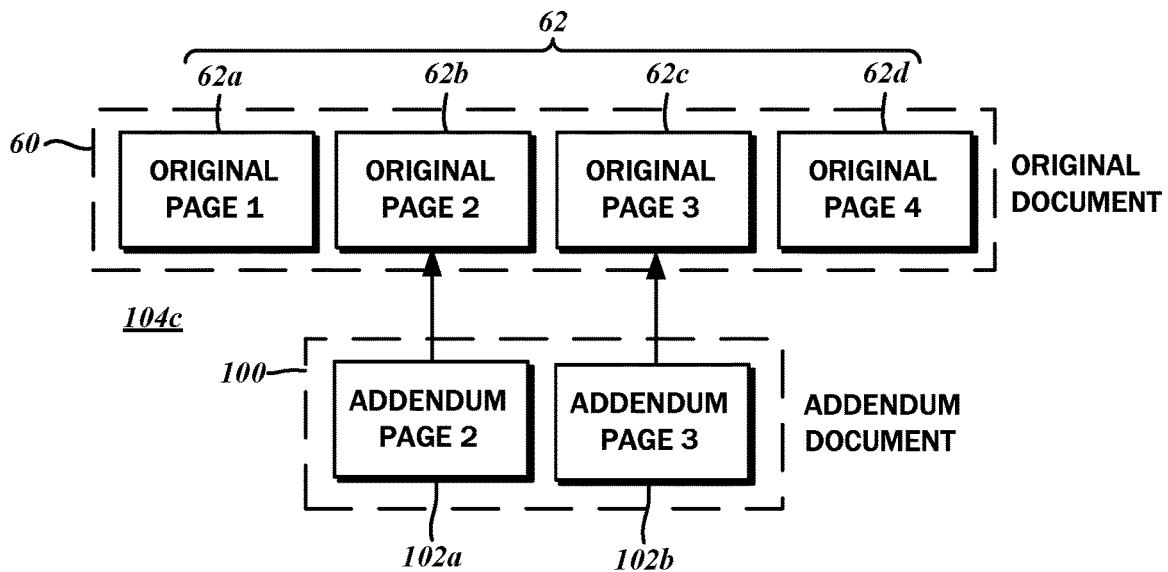

FIG. 9C shows a usage case in which one addendum document 100 includes two addendum pages 102a and 102b, each of which supplements a different original page. Again, there is one original document 60 with original pages 62a-62d. The first of the two addendum pages 102a supplements the second original page 62b, while the second one 102b supplements the third original page 62c. In this case, additional processing of multiple pages within one addendum document 100 is shown, where the sorting is by page label or by page index. The sequence order in the view of the document set 104c is the first original page 62a, the addendum page 102a, the addendum page 102b, and the fourth original page 62d.

Figure 9D:
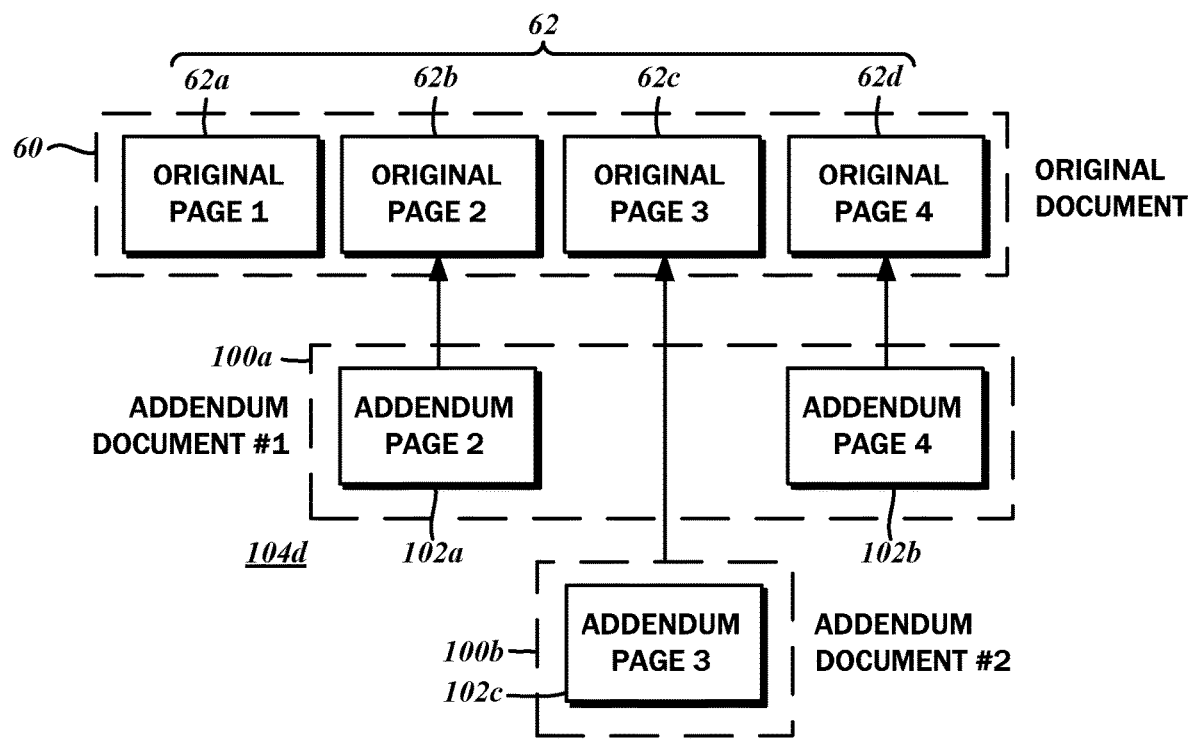

FIG. 9D depicts multiple addendum documents 100a, 100b, though there is just one original document 60 again with original pages 62a-62d. The first addendum document 100a has an addendum page 102a supplementing the second original page 62b, as well as an addendum page 102b supplementing the fourth original page 62d. The second addendum document 100b has one addendum page 102c supplementing the third original page 62c. This case illustrates that addendum pages 102 need not be designated to supplement contiguous original pages 62 by use of page labels. That is, the second original page 62b may have a page label corresponding to that of the addendum page 102a, while the fourth original page 62d may have a page label corresponding to that of the addendum page 102b and be correlated and arranged together on that basis alone, regardless of the page indices. The addendum page 102c of the second addendum document 100b otherwise supplements the original page 62c in a manner similar to that discussed above. The sequence order in the view of the document set 104d is the first original page 62a, the addendum page 102a, the addendum page 102c, and the addendum page 102b. Were the first addendum document 100a to include another addendum page to supplement the third original page 62c, a priority determination would be made between the addendum page 102c of the second addendum document 100b in the manner discussed above with reference to FIG. 9A.

Figure 9E:
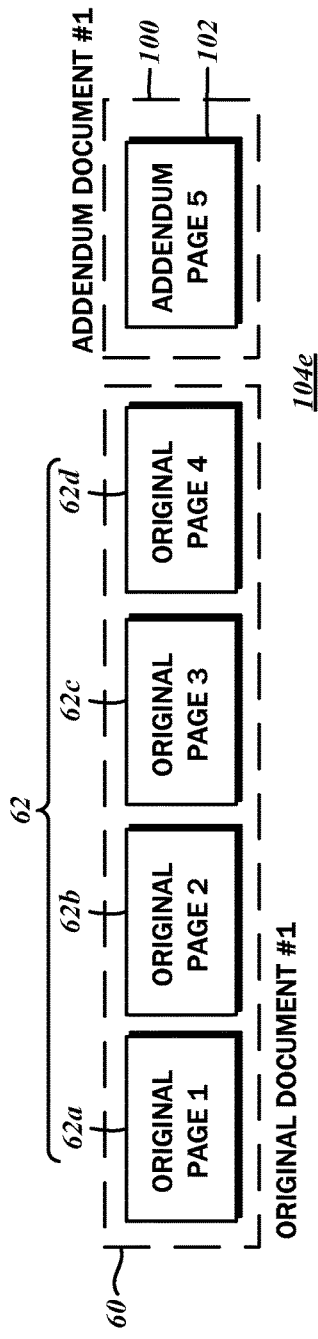

FIG. 9E depicts a case where the addendum document 100, and hence the addendum page 102, does not supplement any existing original pages 62 of the one original document 60. The sequence order in the view of the document set 104e is the first original page 62a, the second original page 62b, the third original page 62c, the fourth original page 62d, and then the addendum page 102.

Figure 9F:
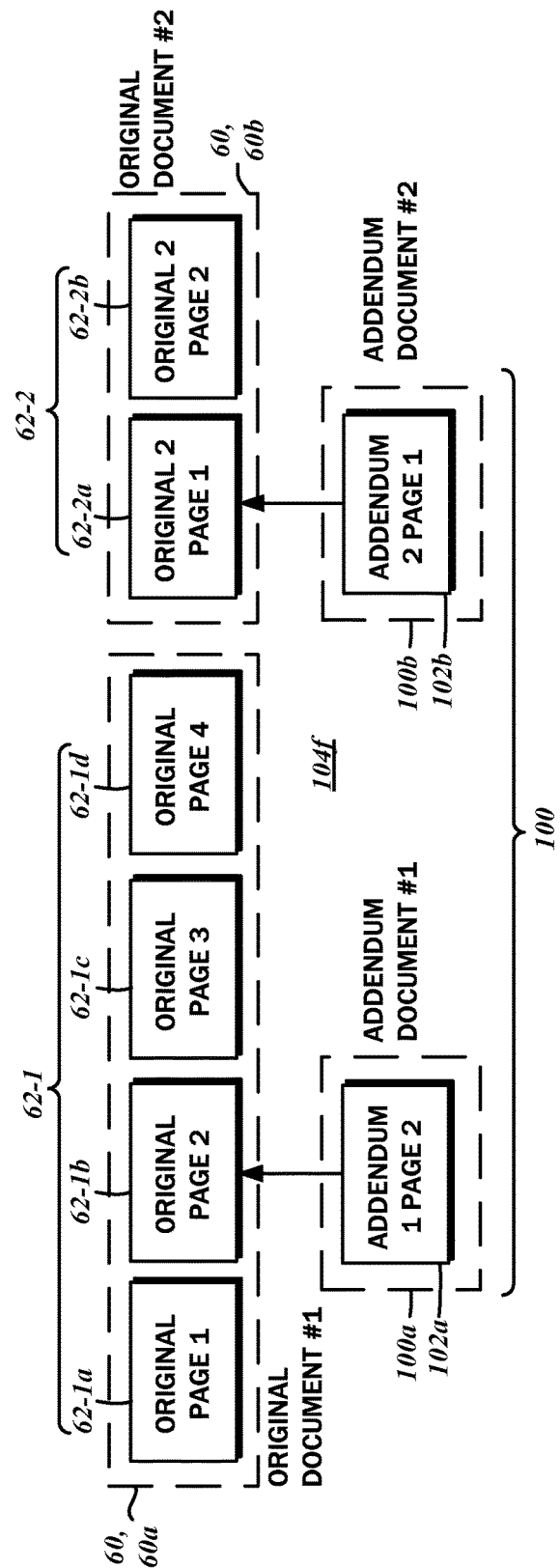

FIG. 9F shows a situation where there are multiple original documents 60 including a first original document 60a and a second original document 60b, as well as multiple addendum documents 100 including a first addendum document 100a and a second addendum document 100b. The first original document 60a includes multiple pages 62-1, including a first original page 62-1a, a second original page 62-1b, a third original page 62-1c, and a fourth original page 62-1d. The first addendum document 100a has one addendum page 102a that supplements the second original page 62-1b. Furthermore, there is a second original document 60b also with multiple pages including a first original page 62-2a and a second original page 62-2b. The second addendum document 100b has one addendum page 102b that supplements the first original page 62-2a.

This example illustrates the ordering and arrangement of the first original document 60a and the second original document 60b, and in particular, the respective original pages 62-1a through 62-1d and 62-2a through 62-2b. It also illustrates that the addendum documents 100 can supplement any of the pages of any original document 60a, 60b. In the view of the document set 104f, the sequence order is therefore the first original page 62-1a, the addendum page 102a, the third original page 62-1c, the fourth original page 62-1d, the addendum page 102b, and the second original page 62-2b of the second original document 60b.

The foregoing examples shown in FIGS. 9A-9F are intended to illustrate some of the organizational and arrangement features of the presently contemplated method for presenting a plurality of documents in which there are original documents addendum documents. These examples are not intended to be limiting, and it is understood that the method can yield other results based on different starting conditions that have not been discussed herein.

The particulars shown herein are by way of example and for purposes of illustrative discussion of the embodiments of the present disclosure only and are presented in the cause of providing what is believed to be the most useful and readily understood description of the principles and conceptual aspects of the disclosure. In this regard, no attempt is made to show more details than is necessary for a fundamental understanding of the disclosure, the description taken with the drawings making apparent to those skilled in the art how the several forms of the presently disclosed methods may be embodied in practice.

What is claimed is:

1. A computer-implemented method of computerized presentation of a plurality of documents including at least one original document having a plurality of original document pages and at least one addendum document having at least one addendum document page, the method comprising:
   receiving a first selection of the at least one original document, each of the plurality of original document pages including an original page label, wherein a page sequencing data element defines a page ordering of the plurality of original document pages based on the original page labels;
   receiving a second selection of the at least one addendum document, each addendum document page of the at least one addendum document being associated with an original document page of the at least one original document based on an addendum page label of the each addendum document page corresponding to the original page label of the associated original document page,
   wherein the each addendum document page of the at least one addendum document is a revised version of the associated original document page;
   generating a document set view comprising the plurality of original document pages of the at least one original document with at least one original document page supplemented in the document set view with the at least one addendum document page of the at least one addendum document that is associated with the at least one original document page, wherein the document set view is configured to order the plurality of original document pages and the at least one addendum document page based on the page sequencing data element such that the at least one addendum document page is arranged at a position corresponding to the at least one original document page among the plurality of original document pages; and displaying the document set view via a graphical user interface (GUI) such that the at least one addendum document page is displayed with the plurality of original document pages including the at least one original document page that is supplemented, with the computerized presentation of the at least one addendum document page visually indicating a prioritization over the at least one original document page that is supplemented.

2. The method of claim 1, wherein the first and second selections are made through a document set definition dialog window including a file listing.

3. The method of claim 2, wherein the file listing includes files that are sorted by at least one of:
file name and page index;
file name and page label; and
page label.

4. The method of claim 1, wherein, if a plurality of addendum document pages of the at least one addendum document are associated with an original document page of the at least one original document, an addendum document page of the plurality of addendum document pages is visually prioritized over another addendum document page of the plurality of addendum document pages based on a priority identifier assigned to the each addendum document page of the plurality of addendum document pages.

5. The method of claim 4, wherein the original document page, to which the plurality of addendum document pages are associated, is displayed in the GUI and at least partially hidden from view.

6. The method of claim 4, wherein the original document page, to which the plurality of addendum document pages are associated, is displayed in the GUI with a deprecation indicator.

7. The method of claim 1, wherein each of the plurality of original document pages further includes a page index, wherein the page sequencing data element comprises an array defining a page ordering of the plurality of original document pages based on the page indices.

8. The method of claim 1, wherein the displaying the document set view comprises:
for each original document page of the plurality of original document pages that is associated with one or more addendum document pages, displaying at least one of the one or more addendum document pages at least partially over the associated original document page such that the one or more addendum document pages and the associated original document page are displayed on the GUI.

9. The method of claim 8, wherein the associated original document is partially obscured by the at least one addendum document page that is displayed on the GUI.

10. The method of claim 8, wherein at least another one of the one or more addendum document pages is partially obscured by the at least one addendum document page such that the one or more addendum document pages and the at least one addendum document page are displayed on the GUI.

11. The method of claim 8, wherein the one or more addendum document pages and the associated original document page are navigable by a user interacting with the one or more addendum document pages and the associated original document page via the GUI.

12. The method of claim 8, wherein the one or more addendum document pages and the associated original document page are arranged in a scrollable stack configuration, with at least a portion of each of the one or more addendum document pages and the associated original document page being visible.

13. A system for computerized presentation of a plurality of documents comprising:
at least one processor; and
at least one storage storing instructions which, when executed by the at least one processor, cause the at least one processor to perform operations for computerized presentation of a plurality of documents including at least one original document having a plurality of original document pages and at least one addendum document having at least one addendum document page, the operations comprising:
receiving a first selection of the at least one original document, each of the plurality of original document pages including an original page label, wherein a page sequencing data element defines a page ordering of the plurality of original document pages based on the original page labels;
receiving a second selection of the at least one addendum document, each addendum document page of the at least one addendum document being associated with an original document page of the at least one original document based on an addendum page label of the each addendum document page corresponding to the original page label of the associated original document page,
wherein the each addendum document page of the at least one addendum document is a revised version of the associated original document page;
generating a document set view comprising the plurality of original document pages of the at least one original document with at least one original document page supplemented in the document set view with the at least one addendum document page of the at least one addendum document that is associated with the at least one original document page, wherein the document set view is configured to order the plurality of original document pages and the at least one addendum document page based on the page sequencing data element such that the at least one addendum document page is arranged at a position corresponding to the at least one original document page among the plurality of original document pages; and
displaying the document set view via a graphical user interface (GUI) such that the at least one addendum document page is displayed with the plurality of original document pages including the at least one original document page that is supplemented, with the computerized presentation of the at least one addendum document page visually indicating a prioritization over the at least one original document page that is supplemented.

14. The system of claim 13, wherein the displaying the document set view comprises:
for each original document page of the plurality of original document pages that is associated with one or more addendum document pages, displaying at least one of the one or more addendum document pages over the associated original document page.

15. The system of claim 14, wherein the associated original document is partially obscured by the at least one addendum document page such that the associated original document and the at least one addendum document page are displayed on the GUI.

16. The system of claim 14, wherein at least another one of the one or more addendum document pages is partially obscured by the at least one addendum document page such that the at least another one of the one or more addendum document pages and the at least one addendum document page are displayed on the GUI.

17. The system of claim 14, wherein the one or more addendum document pages and the associated original document page are navigable by a user interacting with the one or more addendum document pages and the associated original document page via the GUI.

18. The system of claim 14, wherein the one or more addendum document pages and the associated original document page are arranged in a scrollable stack configuration, with at least a portion of each of the one or more addendum document pages and the associated original document page being visible.

19. The system of claim 13, wherein, if a plurality of addendum document pages of the at least one addendum document are associated with an original document page of the at least one original document, an addendum document page of the plurality of addendum document pages is visually prioritized over another addendum document page of the plurality of addendum document pages based on a priority identifier assigned to the each addendum document page of the plurality of addendum document pages.

20. At least one non-transitory computer readable medium storing instructions which, when executed by at least one processor, cause the at least one processor to perform operations for computerized presentation of a plurality of documents including at least one original document having a plurality of original document pages and at least one addendum document having at least one addendum document page, the operations comprising:

receiving a first selection of the at least one original document, each of the plurality of original document pages including an original page label, wherein a page sequencing data element defines a page ordering of the plurality of original document pages based on the original page labels;

receiving a second selection of the at least one addendum document, each addendum document page of the at least one addendum document being associated with an original document page of the at least one original document based on an addendum page label of the each addendum document page corresponding to the original page label of the associated original document page, wherein the each addendum document page of the at least one addendum document is a revised version of the associated original document page;

generating a document set view comprising the plurality of original document pages of the at least one original document with at least one original document page supplemented in the document set view with the at least one addendum document page of the at least one addendum document that is associated with the at least one original document page, wherein the document set view is configured to order the plurality of original document pages and the at least one addendum document page based on the page sequencing data element such that the at least one addendum document page is arranged at a position corresponding to the at least one original document page among the plurality of original document pages; and displaying the document set view via a graphical user interface (GUI) such that the at least one addendum document page is displayed with the plurality of original document pages including the at least one original document page that is supplemented, with the computerized presentation of the at least one addendum document page visually indicating a prioritization over the at least one original document page that is supplemented.

\* \* \* \* \*